US012711436B2

(12) United States Patent
Henry et al.

(10) Patent No.: US 12,711,436 B2
(45) Date of Patent: Aug. 18, 2026

(54) COMPUTING SYSTEMS AND METHODS FOR DEFINING WORK ITEM ASSIGNMENT WORKFLOWS AND INTELLIGENTLY ASSIGNING WORK ITEMS

(71) Applicant: Capital One Financial Corporation, McLean, VA (US)

(72) Inventors: Raja Durai Henry, Buffalo Grove, IL (US); Elango Ramasamy, Buffalo Grove, IL (US); Tricia Marie Bedell, Vernon Hills, IL (US); Randal Lawrence Streator, Batesville, IN (US)

(73) Assignee: Capital One Financial Corporation, McLean, VA (US)

(*) Notice: Subject to any disclaimer, the term of this patent is extended or adjusted under 35 U.S.C. 154(b) by 162 days.

(21) Appl. No.: 18/322,025

(22) Filed: May 23, 2023

(65) Prior Publication Data

US 2024/0394618 A1 Nov. 28, 2024

(51) Int. Cl.
*G06Q 10/0631* (2023.01)
*G06Q 10/10* (2023.01)

(52) U.S. Cl.
CPC ... *G06Q 10/063112* (2013.01); *G06Q 10/103* (2013.01); *G06Q 10/06313* (2013.01)

(58) Field of Classification Search
CPC ......... G06Q 10/06316; G06Q 10/0633; G06Q 10/063; H04M 3/5233; H04M 2203/402; H04M 3/5232

(Continued)

(56) References Cited

U.S. PATENT DOCUMENTS 6,859,529 B2 2/2005 Duncan et al.
7,027,997 B1 * 4/2006 Robinson ......... G06Q 10/06311 719/310

(Continued)

FOREIGN PATENT DOCUMENTS

CN 104751340 B 6/2020

OTHER PUBLICATIONS

Genesys. Intelligent Workload Distribution. How IWD works—Genesys Documentation, 1 page [retrieved online]. Retrieved from: URL:https://all.docs.genesys.com/PEC-IWD/Current/Administrator/IWD>.

(Continued)

*Primary Examiner* — Rutao Wu
*Assistant Examiner* — Letoria G Knight
(74) *Attorney, Agent, or Firm* — Lee Sullivan Shea & Smith LLP

(57) ABSTRACT

Systems and methods for intelligently facilitating assignment of work items involve providing a user interface for creating work item assignment workflows and receiving data defining workflows for assigning work items, the workflows each indicating (i) one or more factors based on which work items should be identified for assignment to an agent and (ii) a prioritization scheme for determining an order in which identified work items should be assigned. In response to receiving a work item assignment request on behalf of an agent, a pre-defined workflow is obtained, and based on the workflow, (i) available work items from multiple computing systems are identified for assignment to the agent and (ii) a prioritized order for assigning the identified work items is determined. Based on the identified work items and the determined order, a personalized work item queue is generated for the agent, from which work items are assigned to the agent.

20 Claims, 5 Drawing Sheets

(58) Field of Classification Search
USPC ..... 705/7.14, 7.26, 7.27; 379/265.05, 266.01
See application file for complete search history.

(56) References Cited

U.S. PATENT DOCUMENTS

| | | | |
|---|---|---|---|
| 7,536,002 | B1 | 5/2009 | Ma et al. |
| 7,916,858 | B1 | 3/2011 | Heller et al. |
| 10,044,866 | B2 | 8/2018 | Sharpe et al. |
| 10,713,603 | B2 | 7/2020 | Hamilton et al. |
| 11,330,108 | B2 | 5/2022 | Wolthuis et al. |
| 2003/0152212 | A1* | 8/2003 | Burok .................... G06Q 10/06 379/265.02 |
| 2005/0033626 | A1* | 2/2005 | Kruse .............. G06Q 10/06311 705/7.13 |
| 2012/0130936 | A1* | 5/2012 | Brown ..................... G06N 7/02 706/52 |
| 2017/0213171 | A1* | 7/2017 | Dubash ............ G06Q 10/06314 |
| 2020/0151650 | A1* | 5/2020 | Rhodes ................ G06Q 30/016 |
| 2021/0142244 | A1* | 5/2021 | Chan ....................... H04L 43/16 |
| 2023/0385779 | A1* | 11/2023 | Yin .................... G06Q 10/1097 |
| 2025/0126209 | A1* | 4/2025 | Wolthuis ........ G06Q 10/063114 |

OTHER PUBLICATIONS

Genesys. Intelligent Workload Distribution. IWD Overview, last edited May 2, 2019, 3 pages [retrieved online]. Retrieved from: URL:https://docs.genesys.com/Documentation/IWD/9.0.0/User/IWDOverview>.

* cited by examiner

COMPUTING SYSTEMS AND METHODS FOR DEFINING WORK ITEM ASSIGNMENT WORKFLOWS AND INTELLIGENTLY ASSIGNING WORK ITEMS

BACKGROUND

A business organization's success depends largely on how well it is able to manage various business processes that support the business organization's goals. Many business organizations today utilize an approach known as "business process management" (BPM) that aims to optimize business processes in an effort to reduce operational costs and increase quality, productivity, adaptability, innovation, growth, and customer satisfaction.

To assist business organizations with implementing BPM, software technology that facilitates BPM implementation has been developed. However, existing BPM software technology fails to address emerging challenges as business organization needs continue to evolve.

OVERVIEW

As mentioned above, many business organizations today implement BPM to optimize the organizations' various business processes. In a typical BPM framework, a business organization may operate multiple disparate computing systems, commonly referred to as BPM systems, for handling different types and/or categories of business tasks. In operation, each BPM system functions to track the status of work items related to a particular business process and allow agents of the business organization (e.g., employees tasked with completing human-side operations of business tasks) to access and address the work items via a dedicated client interface for that BPM system.

However, existing technology for facilitating work item assignment across BPM systems has several shortcomings. To address these and other challenges, disclosed herein is new software technology that enables creation of customized work item assignment workflows and generation of personalized work item queues.

In one aspect, the disclosed technology may take the form of a method to be carried out by a computing platform that involves (i) receiving, from an end-user device associated with a given agent, an indication of a work item assignment request, (ii) based on the request, obtaining a work item assignment workflow that includes a prioritization scheme for sorting identified work items, (iii) identifying a set of work items that are available for assignment to the given agent, wherein the set of work items comprises work items from each of two or more computing systems that are configured to track work items for assignment, (iv) applying the prioritization scheme to the identified set of work items and thereby determining an order for assigning the work items in the set of work items to the given agent, (v) based on determining the order for assigning the work items, generating a personalized work item queue for the given agent, and (vi) causing a given work item from the personalized work item queue to be assigned to the given agent.

In an example embodiment, the method may further involve, before receiving the indication of the work item assignment request, (vii) causing an end-user device associated with a user to display one or more user interface views for defining work item assignment workflows, (viii) receiving data defining the work item assignment workflow, and (ix) causing storage of a data record representing the work item assignment workflow.

In another example embodiment, the method may further involve, after generating the personalized work item queue for the given agent, (vii) receiving data defining a modification to the work item assignment workflow, (viii) updating a data record representing the work item assignment workflow to reflect the modification, and (ix) based on the modified work item assignment workflow, generating an updated personalized work item queue for the given agent.

Further, the work item assignment workflow may take various forms, and in some example embodiments, may further indicate one or more one factors based on which work items are to be identified, and the one or more factors may relate to completion of each respective work item. For instance, in an example embodiment, the one or more factors may include one or more of a create date, an agent skill level, a time sensitivity, a priority level, or an identification of a particular computing system that is configured to track work items.

Further yet, identifying the set of work items that are available for assignment to the given agent may take various forms, and in an example embodiment, may involve (i) sending a request to each of the two or more computing systems to provide work items that are available for assignment, wherein each request includes an indication of the one or more factors based on which work items are to be identified, and (ii) receiving, from each computing system, a respective listing of work items that are available for assignment.

Further still, the prioritization scheme included in the workflow may take various forms, and in some example embodiments, may indicate one or more factors according to which identified work items should be prioritized for assignment.

As a further possibility, applying the prioritization scheme to the set of work items that are identified take various forms, and in some example embodiments, may involve (i) for each work item in the set of work items, (a) determining a respective factor-specific priority value for each factor and (b) based on the respective factor-specific priority values, determining a work item-specific priority value, and (ii) sorting the set of work items according to each work item's respective work item-specific priority value.

As a further possibility, causing the given work item to be assigned to the given agent may take various forms, and in some example embodiments, may involve (i) providing an indication to the computing system from which the given work item was identified that the work item has been assigned, and (ii) causing an end-user device associated with the given agent to display a representation of the given work item.

In some example embodiments, the personalized work item queue may comprise a subset of the set of work items.

In another aspect, disclosed herein is a computing platform that includes at least one network interface, at least one processor, at least one non-transitory computer-readable medium, and program instructions stored on the at least one non-transitory computer-readable medium that, are executable by the at least one processor such that the computing platform is configured to carry out one or more of the functions disclosed herein, including but not limited to the functions of the foregoing methods.

In another aspect, disclosed herein is at least one non-transitory computer-readable medium, wherein the at least one non-transitory computer-readable medium is provisioned with program instructions that, when executed by at least one processor, cause a computing platform to carry out one or more of the functions disclosed herein, including but not limited to the functions of the foregoing methods.

One of ordinary skill in the art will appreciate these as well as numerous other aspects in reading the following disclosure.

Figure 1:
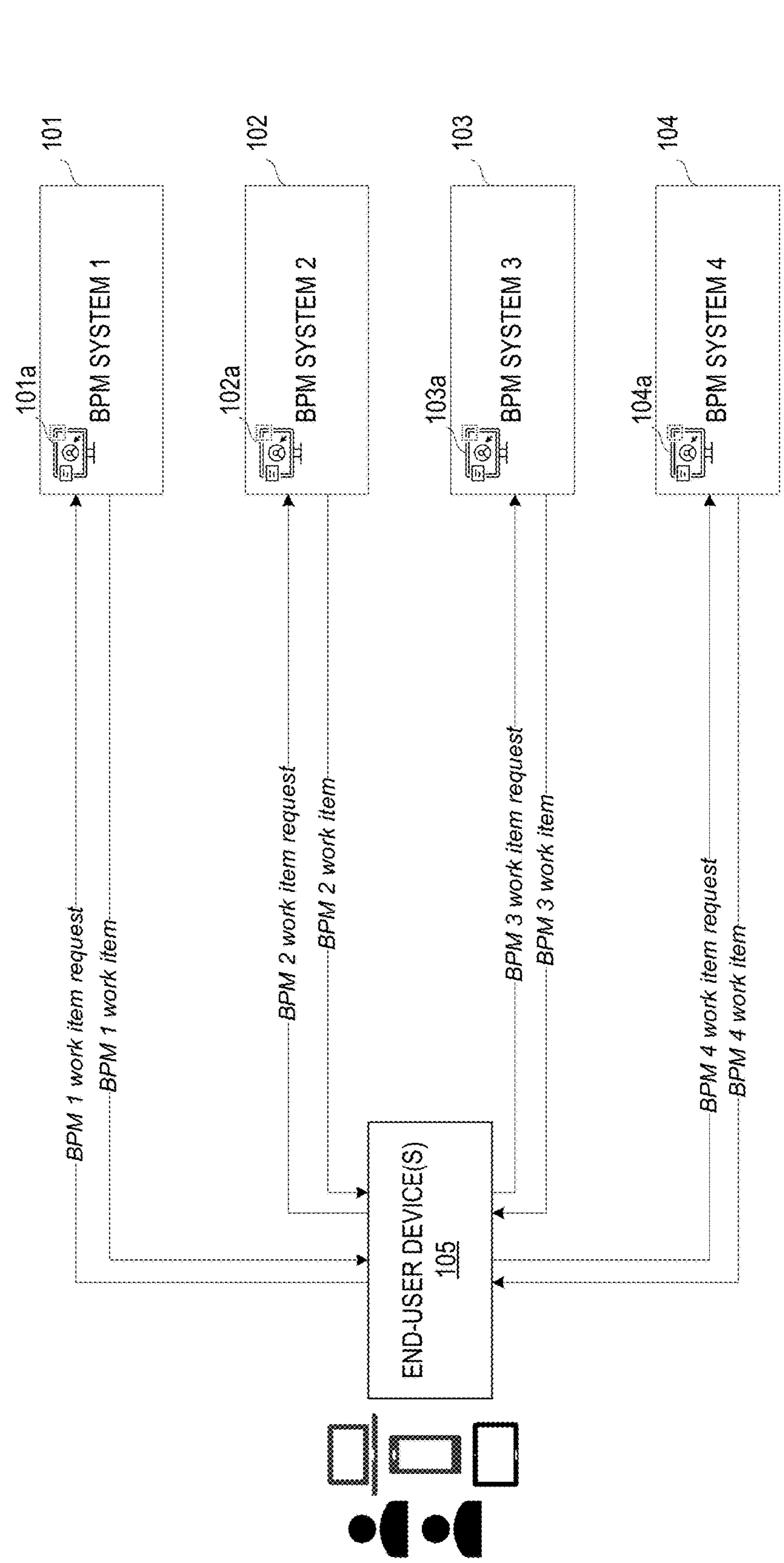
FIG. 1 depicts a flow diagram of an example computing environment that includes a work item assignment system.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

As mentioned above, in a typical BPM framework, a business organization may operate multiple disparate BPM systems that each functions to track the status of work items related to a particular business process, and agents of the business organization may access those work items for assignment via a dedicated client interface for each BPM system.

To illustrate, FIG. 1 depicts a flow diagram of an example computing environment 100 that employs a typical BPM framework for assigning work items to agents. As shown in FIG. 1, the example computing environment 100 may involve various BPM systems, such as BPM systems 101, 102, 103, and 104. Each of the BPM systems 101-104 may function to track the status of work items related to a respective business process of a business organization. Further, each BPM system may have a respective client-side interface 101*a*, 102*a*, 103*a*, and 104*a* that may be accessed via one or more end-user devices 105. For instance, an agent of the business organization (e.g., an employee of the business organization that is tasked with completing a human-side operation of a business task) may use an end-user device 105 to access one or more of the client-side interfaces 101*a*, 102*a*, 103*a*, or 104*a* to retrieve a work item.

However, this approach for assigning work items within a typical BPM framework has several shortcomings. For instance, because each BPM system has a dedicated interface that is accessible via a respective interface portal, agents of the business organization typically need to keep track of login credentials for each respective portal to be able to access each BPM system's system to retrieve work items, which may involve providing respective login credentials for that interface in order to gain access, navigate to one or more user interface views for work items related to the given BPM system, and then request a work item to be assigned to the agent.

Further, the different interfaces of the different BPM systems may have different designs/layouts and workflows, which may require agents to learn how to interact with each interface in order to become familiar and work with that interface, which can be time-consuming, costly, and cumbersome.

Further yet, agents may need to access different BPM systems throughout a given work session, and switching between interfaces/portals can be laborious and lead to reduced agent productivity. For instance, an agent may access a first BPM system by accessing the first BPM system's respective client-side interface, which may involve providing respective login credentials for that interface in order to gain access, navigating to one or more user interface views for work items related to the first BPM system, and then selecting a work item to be assigned to the agent. If the agent later needs to retrieve a work item from a second BPM system, the agent may need to access the second BPM system's respective client-side interface, which may involve providing respective login credentials for that client interface in order to gain access, navigate to one or more user interface views for work items related to the second BPM system, and then selecting a work item to be assigned to the agent. In some instances, the agent may be prohibited from being logged into multiple BPM system interfaces at a given time, and may thus be required to log out of one interface before accessing a different interface, which can be frustrating and may lead to delays in resolving work items.

Still further, in a typical BPM framework, where work items from different BPM systems have different priority needs, such priority information may not be centrally accessible nor directly relatable to each other. Thus, agents may need to keep track of different work item priorities across BPM systems and attempt to select work items based on those priorities, which can be burdensome and may lead to errors in priority-based work item retrieval.

Furthermore, to the extent that a BPM framework for facilitating work item resolution involves a centralized work item list, an agent is typically required to assess the available work items in order to determine which work item to select for assignment to the agent. In some instances, this may result in a work item being assigned to an agent that does not have the requisite qualifications or skill level to successfully resolve that work item, in which case the agent would need to unassign the work item to return the work item to the work item list for retrieval by a different agent, and then proceed to select a different work item for assignment. For example, an agent may select a first work item from a centralized list to be assigned to the agent, and upon opening the work item, may discover that the work item requires a different level of qualification or different skills than the agent possesses. The agent would then need to unassign the work item so that it returns to the centralized list, and then proceed to find a different work item. In some instances, the agent may not realize that a work item the agent has selected for assignment requires different qualifications than the agent possesses and may nevertheless attempt to resolve the work item, which may lead to incorrectly completed work items, increased costs, and/or customer dissatisfaction.

Further yet, even where such a centralized work item list is available, such a centralized list is typically made available to a group of agents (e.g., all agents that are active at a given time), thus requiring each agent to assess the available work items in order to determine which work item to select for assignment. Moreover, existing BPM frameworks do not provide a mechanism for an agent to obtain a personalized list of work items that has been generated specifically for the agent based on various criteria.

To address these and other challenges, disclosed herein is new software technology for facilitating intelligent assignment of work items. While the examples that follow are described in the context of being implemented within a BPM framework, it should be understood that the disclosed software technology can be applied in other areas as well. At a high level, the disclosed software technology for facilitating intelligent assignment of work items comprises one or more back-end software engines and one or more front-end user interfaces for facilitating assignment of work items. In one aspect, the disclosed technology enables configuration of work item assignment workflows and prioritization schemes that dictate how work items should be identified and assigned. In another aspect, the disclosed technology enables generation of personalized work item queues. The disclosed software technology may be run by a back-end computing platform that is operated by a business organization.

a. Example Computing Environment

Figure 2:
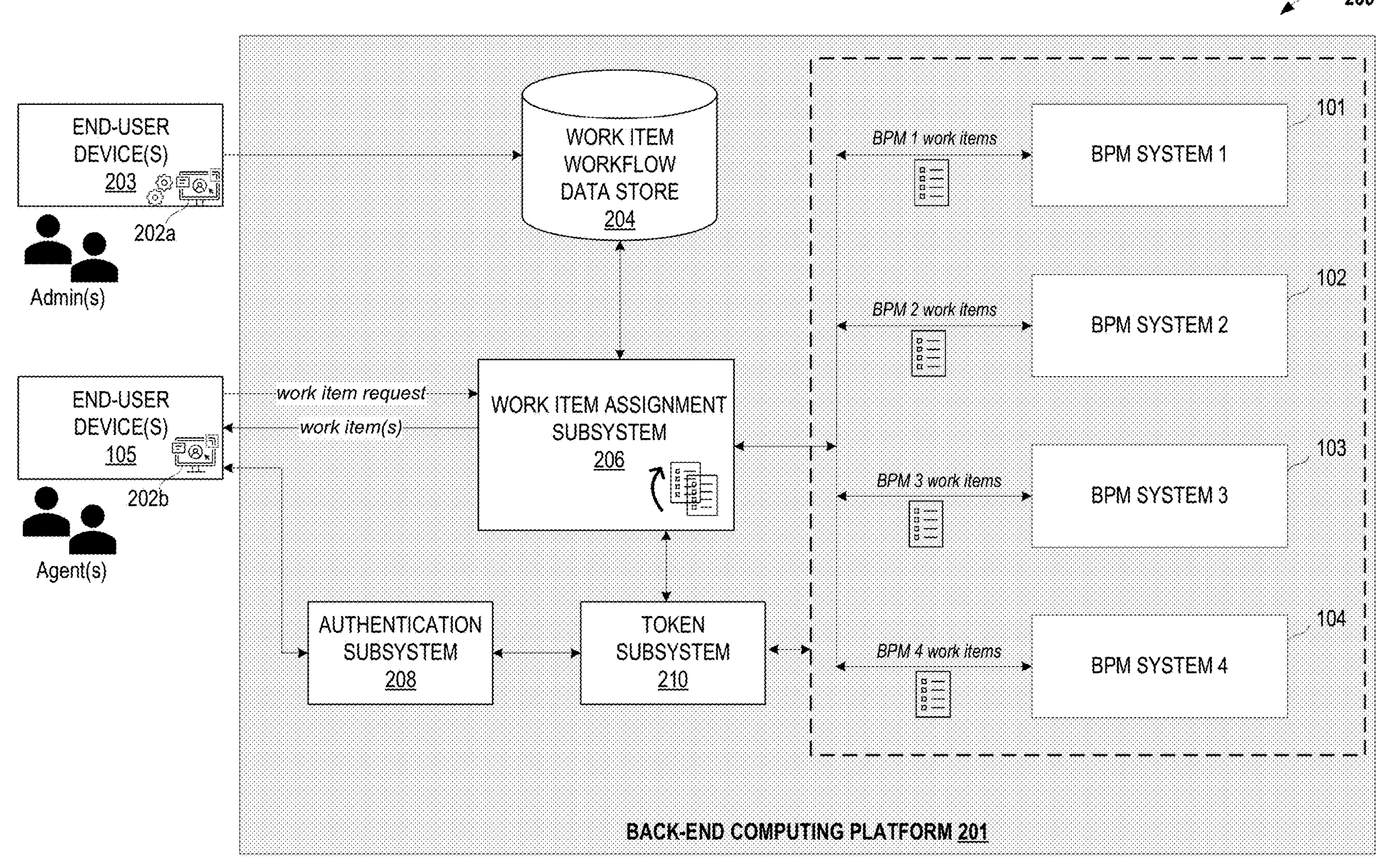
FIG. 2 depicts a flow diagram of an example computing environment that includes a work item assignment system that is configured to include new software subsystems for defining work item assignment workflows and intelligently assigning work items in accordance with example implementations of the disclosed technology.

FIG. 2 depicts a diagram of an example computing environment 200 that includes various computing subsystems that may be configured to implement the disclosed software technology and perform operations related to one more techniques disclosed herein. Like the computing environment 100 shown in FIG. 1, the computing environment 200 shown in FIG. 2 may involve the one or more end-user devices 105 that may be used by one or more agents of a business organization to access work items from various BPM systems, including the BPM systems 101, 102, 103, and 104. However, as shown in FIG. 2, the computing environment 200 further includes one or more end-user devices 203, as well as (i) a work item assignment workflow data store 204, (ii) a work item assignment subsystem 206, (iii) an authentication subsystem 208, and (iv) a token subsystem 210, all of which, along with the BPM systems 101-104, may be hosted by a back-end computing platform 201 that is operated by the business organization and that serves to facilitate one or more of the functionalities described herein. It should be understood that, in practice, each of these subsystems may generally take the form of some logical set of computing resources (e.g., one or more processors, memory, etc.) of the back-end computing platform 201 that are provisioned with executable program instructions for carrying out the functions of the subsystem. In this respect, the set of computing resources utilized to implement each subsystem may be part of a single physical computing system, or may be distributed across multiple physical computing systems that are networked together, among various other possibilities.

The various functionalities that may be carried out within the computing environment 200 according to the new approach disclosed herein for facilitating intelligent assignment of work items will now be described at a high level, followed by a more detailed discussion of specific functionalities.

As one element of this new approach for facilitating intelligent assignment of work items to agents, the disclosed software technology may comprise a user interface that enables a representative of a business organization (e.g., an administrator (admin), a manager, etc.) to define one or more work item assignment workflows based on which work items are to be obtained for potential assignment to agents of the business organization that are tasked with addressing work items. In practice, an admin of the business organization may use an end-user device 203 (e.g., a laptop computer, a desktop computer, a tablet, etc.) to access a portal 202*a*. The portal 202*a* may be a software application (e.g., a web application, a mobile application, etc.) that provides a user interface for performing various tasks, including, for example, defining work item assignment workflows. The portal 202*a* may be hosted by a back-end computing platform (e.g., the back-end computing platform 201) that is operated by the business organization. In one implementation, the portal 202*a* may be an administrator-specific portal that provides access to user interface views for performing tasks associated with administrator responsibilities, such as creating work item assignment workflows. In another implementation, the portal 202*a* may be a general portal accessible to any employee of the business organization that provides access to user interface views based on an employee's individual permissions. In any event, the admin may have an existing user account with the business organization and may log in to the portal 202*a* via the existing user account by providing login credentials for the admin's user account.

In turn, the login credentials provided by the admin may be validated by the back-end computing platform 201 (e.g., by the authentication subsystem 208) to authenticate the admin. If the authentication is successful, the back-end computing platform 201 may cause the end-user device 203 to display one or more user interface views for defining work item assignment workflows.

In general, a work item assignment workflow may dictate how work items are obtained for assignment to an agent. For instance, a work item assignment workflow may define one or more work item characteristics based on which work items are to be identified for potential assignment to an agent. The one or more user interface views that are presented to the admin for defining the work item assignment workflow may enable the admin to provide user input identifying the one or more work item characteristics, which may involve selecting work item characteristics to add to the workflow and/or identifying new work item characteristics to add to the workflow, among other possibilities as will be explained further below. Further, the work item assignment workflow may dictate a prioritization scheme based on which obtained work items are to be prioritized for assignment to the agent. The prioritization scheme may be applied in instances where two or more work items are obtained for potential assignment. The work items may be intelligently prioritized based on evaluating various possible factors defined in the prioritization scheme. In some implementations, the prioritization scheme may be customized by the admin to define how the various possible factors should be weighted during evaluation. In other implementations, the prioritization scheme may use a pre-defined weighting scale for the various possible factors. The functionality of defining a prioritization scheme and intelligently prioritizing work items will be discussed in more detail below.

After the admin has provided the input defining the work item assignment workflow, the end-user device 203 may transmit data defining the work item assignment workflow to the back-end computing platform 201. In turn, the back-end computing platform 201 may cause the data defining the work item assignment workflow to be stored in a data store that is accessible to the work item assignment subsystem 206, such as the work item assignment workflow data store 204 shown in FIG. 2. The work item assignment workflow data store 204 may then be accessed by the work item assignment subsystem 206 in response to a request to identify work items for assignment to an agent.

For instance, an agent of the business organization may use an end-user device 105 to access a portal 202*b*. The portal 202*b* may be a software application (e.g., a web application, a mobile application, etc.) that provides a user interface for performing various tasks, including, for example, requesting work item assignments. The portal 202*a* may be hosted by a back-end computing platform (e.g., the back-end computing platform 201) that is operated by the business organization. In one implementation, the portal 202*b* may be an agent-specific portal that provides access to user interface views for performing tasks associated with agent responsibilities, such as requesting work item assignments and addressing work items. In another implementation, the portal 202*b* may be a general portal accessible to any employee of the business organization that provides access to user interface views based on an employee's individual permissions. In such an implementation, the portal 202*b* and the portal 202*a* may be the same. In any event, the agent may have an existing user account with the business organization and may log in to the portal 202*b* via the existing user account by providing login credentials for the agent's user account.

In turn, the login credentials provided by the agent may be validated by the back-end computing platform 201 to authenticate the agent. If the authentication is successful, the back-end computing platform 201 may cause the end-user device 105 to display one or more user interface views for requesting work item assignments.

The agent may then submit a request for a new work item assignment via the one or more interface views presented at the end-user device 105. In turn, the end-user device 105 may transmit an indication of the request to the back-end computing platform 201. In some implementations, a particular subsystem of the back-end computing platform 201 may be configured to receive the indication of the request. For instance, as shown in FIG. 2, the indication of the request may be received by the work item assignment subsystem 206.

The work item assignment subsystem 206 may comprise a software engine that is configured to handle requests for work item assignments, which may involve various operations, such as receiving a request for a work item assignment, retrieving a work item assignment workflow, communicating with one or more computing systems (e.g., BPM systems) to obtain work items based on the workflow, prioritizing the obtained work items, generating a work item queue for the agent, and causing the work item queue to be provided to the end-user device 105 for delivery to the agent, among other possibilities. The work item assignment subsystem 206 may interact with one or more other computing systems to carry out such operations.

For instance, as noted above, the work item assignment subsystem 206 may receive requests for work items on behalf of agents from one or more end-user devices 105. Further, the work item assignment subsystem 206 may interact with the work item assignment workflow data store 204 to obtain stored work item assignment workflows.

Further yet, the work item assignment subsystem 206 may communicate with the authentication subsystem 208, which may be a computing subsystem that is configured to perform user authentications. In one implementation, the authentication subsystem 208 may comprise a computing system that is configured to operate the Lightweight directory Access Protocol (LDAP) (e.g., an LDAP server) to obtain information about a user, such as an admin requesting to define a work item assignment workflow or an agent requesting a work item assignment. For example, the authentication subsystem 208 may be configured to validate login credentials provided by an admin at an end-user device 203 and/or to obtain information about what portal features the admin is permitted to access, among other possibilities. As another example, the authentication subsystem 208 may be configured to validate login credentials provided by an agent at an end-user device 105 and/or to obtain and store information about what types of work items the agent is permitted to access, a skill level associated with the agent, or qualifications associated with the agent, among other possibilities. The authentication subsystem 208 may take other forms as well.

As another example, the work item assignment subsystem 206 may communicate with the token subsystem 210, which may be a computing system that is configured to generate and/or validate access tokens to facilitate communication between the work item assignment subsystem 206 and one or more of the BPM systems 101-104 in order to obtain work items for assignment to the agent.

The work item assignment subsystem 206 may be configured to perform other operations as well in order to carry out one or more of the processes disclosed herein.

The various functionalities that may be performed by the back-end computing platform 201 (e.g., one or more computing subsystems thereof) will be described in more detail further below.

b. Example Techniques for Defining a Work Item Assignment Workflow

As mentioned above, the various computing systems of the computing environment 200 shown in FIG. 2 may coordinate with one another to facilitate various techniques disclosed herein related to defining work item assignment workflows.

Figure 3:
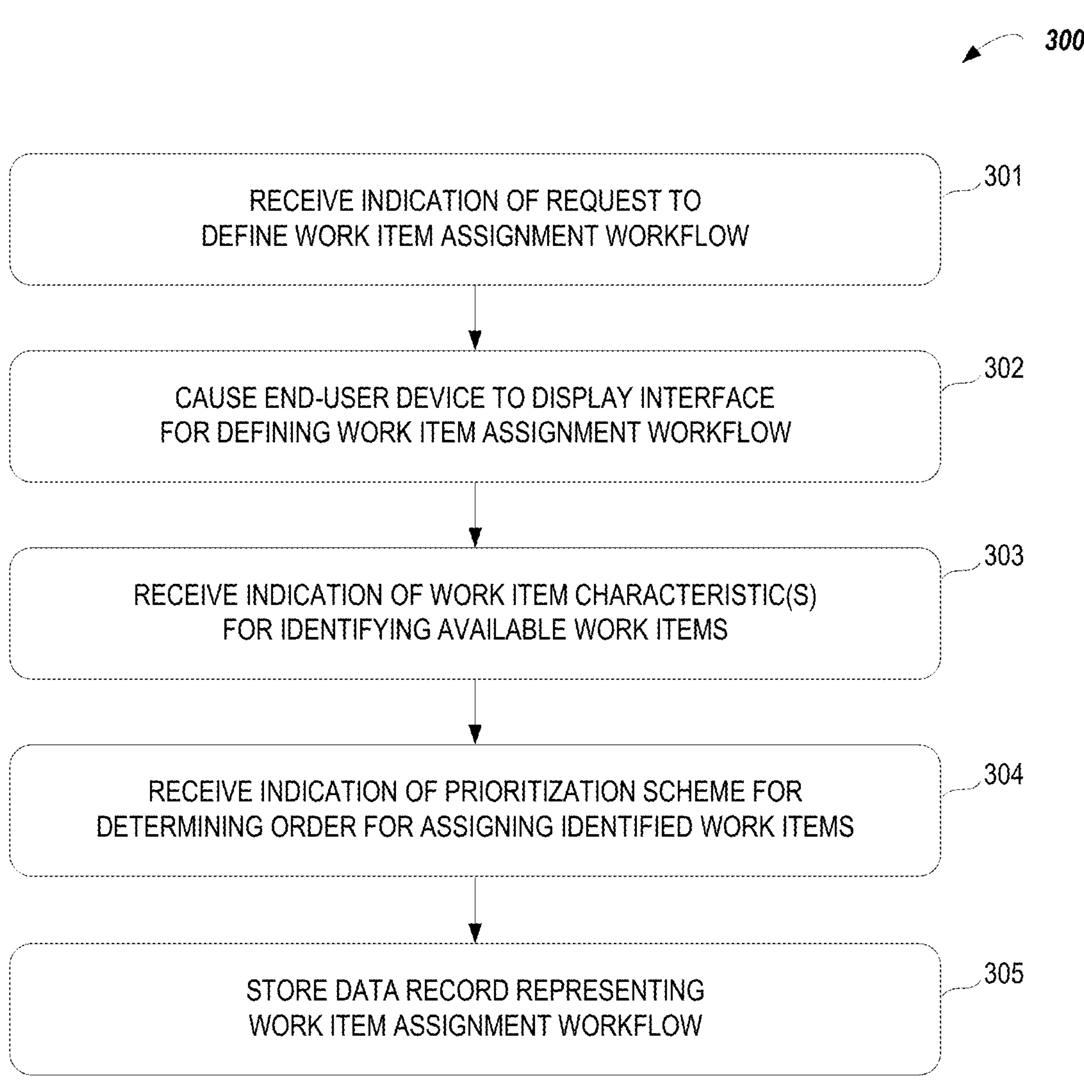
FIG. 3 depicts a flow chart of an example process for defining a work item assignment workflow in accordance with one example implementation of the disclosed technology.

Turning now to FIG. 3, a flow diagram of an example process 300 for facilitating creation of a work item assignment workflow is shown. The example process 300 may include one or more operations, functions, or actions as illustrated by one or more of steps 301-305. Although steps 301-305 are illustrated in sequential order, these steps may also be performed in parallel, and/or in a different order than those described herein. Also, the various steps may be combined into fewer steps, divided into additional steps, and/or removed based upon the desired implementation. Furthermore, in the examples below while the steps 301-305 may be described as being performed by a certain computing device depicted in the example shown in FIG. 2, it is possible that depending on the implementation, any one or more of the steps 301-305 may be performed by a different computing device depicted in the example shown in FIG. 2, or may be split amongst one or more of the computing devices depicted in the example shown in FIG. 2.

In addition, for the example process 300, the flow diagram shows functionality and operation of one possible implementation of embodiments described herein. In this regard, each step may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the example process 300, each step shown in FIG. 3 may represent circuitry that is wired to perform the specific logical functions in the process.

The example process 300 includes operations that may be carried out in relation to facilitating creation of a work item assignment workflow, which may generally involve providing a user with access to one or more interface views for defining work item assignment workflows, receiving data defining a new work item assignment workflow, and storing a data record representing the new work item assignment workflow.

The example process 300 may be initiated when a representative of a business organization (e.g., an admin) submits a request to define a work item assignment workflow. As mentioned above, in practice, the admin may access, via an end-user device 203, a software application 202*a* (e.g., a web application, a mobile application, etc.) —which may also be referred to herein as a portal—hosted by the back-end computing platform 201 that is operated by the business organization. In one implementation, the portal 202*a* may be an administrator-specific portal that provides access to user interface views for performing tasks associated with administrator responsibilities. In another implementation, the portal 202*a* may be a general portal accessible to any employee of the business organization that provides access to user interface views based on an employee's individual permissions. In any event, the admin may have an existing user account with the business organization and may log in to the portal via the existing user account by providing login credentials for the admin's user account.

In turn, the login credentials may be validated by the back-end computing platform 201 to authenticate the admin. In one implementation, the authentication may be performed by the authentication subsystem 208. For instance, the back-end computing platform 201 may receive data from the end-user device 203 that includes the admin's login credentials, and the authentication subsystem 208 may perform the authentication based on the provided login credentials to determine if the admin has permission to access one or more user interface views for performing tasks related to defining a work item assignment workflow. If the authentication is successful, the back-end computing platform 201 may cause the end-user device 203 to provide the admin with access, and the admin may then navigate to the one or more user interface views for defining work item assignment workflows and input a request to define a work item assignment workflow. In response to the input, the end-user device 203 may provide an indication of the request to the back-end computing platform 201.

At step 301, the back-end computing platform 201 may receive the indication of the request to define a work item assignment workflow. In turn, at step 302, the back-end computing platform 201 may cause the end-user device 203 to display one or more user interface views for providing user input defining the work item assignment workflow. In general, a work item assignment workflow may comprise information that dictates (i) how to identify work items for potential assignment to an agent and perhaps also (ii) how to prioritize the identified work items for assignment. In this regard, a work item assignment workflow may indicate (i) one or more factors based on which work items are to be identified for assignment and perhaps also (ii) a prioritization scheme that defines one or more factors that are to be evaluated in order to determine an order in which the identified work items should be assigned.

The one or more user interface views that are presented at the end-user device 203 may enable the admin to provide user input identifying the one or more factors based on which work items may be identified for assignment to an agent. These factors may be referred to herein as work item characteristics. Such work item characteristics may take various forms.

For example, as one possibility, a work item characteristic may comprise a skill requirement that may indicate one or more particular qualifications (e.g., certifications an agent has achieved, languages an agent speaks, etc.) or a minimum skill level that is required to resolve the work item. For example, a work item that involves contacting a customer of the business organization may require an agent to speak a particular language in order to be able to communicate with the customer. As another example, a work item that involves revising program code for the business organization's website may require an agent to be proficient in a particular programming language. Other examples are also possible.

As another possibility, a work item characteristic may comprise a create date that indicates a date and/or time that the work item was created. As yet another possibility, a work item characteristic may comprise a time sensitivity that indicates how quickly the work item needs to be resolved. In this respect, the time sensitivity could comprise a particular time by which the work item should be resolved (e.g., within 3 days of create date, by a particular deadline, etc.).

Still, as another possibility, a work item characteristic may comprise an indication of a priority level for the work item. For instance, at the time the work item was created, it may have been associated with a data field indicating a level of urgency (e.g., high priority, medium priority, low priority, etc.) with which the work item must be resolved. As yet another possibility, a work item characteristic may comprise an indication of a particular BPM system from which the work item originated (e.g., product manufacturing, product delivery, sales, customer support, technical support, etc.). Further, as another possibility, a work item characteristic may comprise a category that indicates what type of action is required to resolve the work item (e.g., customer follow-up, order adjustment, code debugging, etc.).

Further yet, as another possibility, a work item characteristic may comprise an indication of a time of day, which may indicate that the work item should be considered for assignment if an agent request for a work item is received during the indicated time of day. For example, the work item may be of a type that typically takes a certain amount of time to resolve, and the time of day characteristic may indicate whether or not an agent would have enough time to resolve the work item based on the time at which the agent's request for a work item was received.

Other examples of work item characteristics are also possible.

The manner in which work item characteristics are identified by the admin may take various forms. For example, as one possibility, work item characteristics may be selected from a listing of work item characteristics. For instance, the one or more user interface views may display a listing of work item characteristics such that the admin may provide an input (e.g., checkbox input, drag and drop input, etc.) selecting each work item characteristic that is to be included in a work item assignment workflow. As another possibility, work item characteristics may be provided by an admin. For instance, the one or more user interface views may include one or more data fields whereby the admin may input a new work item characteristic that is to be included in a work item assignment workflow.

In some implementations, the back-end computing platform 201 may be configured to recommend work item characteristics for inclusion in a work item assignment workflow. The back-end computing platform 201 may provide a recommendation based on various factors. For instance, as one possibility, the back-end computing platform 201 may recommend one or more work item characteristics based on work item characteristics that were included in a previously-defined work item assignment workflow. As another possibility, the back-end computing platform 201 may recommend one or more work item characteristics based on information available about unassigned work items. For instance, the back-end computing platform 201 may analyze information included in one or more data fields of unassigned work items (e.g., unassigned work items from BPM systems 101, 102, 103, and/or 104) and recommend work item characteristics based on that information. For example, the back-end computing platform 201 may determine that a portion of the unassigned work items share certain work item characteristics and may recommend these shared work item characteristics for inclusion in the work item assignment workflow. As another example, the back-end computing platform 201 may determine that certain unassigned work items require certain agent qualifications and/or skill levels and may recommend agent-related work item characteristics for inclusion in the work item assignment workflow. The back-end computing platform 201 may recommend work item characteristics based on other factors as well.

Based on the user input(s) provided by the admin indicating one or more work item characteristics that are to be included in the work item assignment workflow, the end-user device 203 may transmit an indication of the one or more work item characteristics to the back-end computing platform 201. In this respect, the end-user device 203 may provide a respective indication corresponding to each user input, or an indication of multiple user inputs collectively identifying multiple work item characteristics.

At step 303, the back-end computing platform may receive the indication of the one or more work item characteristics that are to be included in the work item assignment workflow, based on the user input(s) provided by the admin at the end-user device 203.

In some implementations, the one or more user interface views may enable the admin to provide user input indicating additional information that dictates how work items are to be identified or how identified work items are to be culled. For example, as one possibility, the work item assignment workflow may include one or more filters that are to be applied to work items that have been identified for assignment to an agent. Such a filter may take various forms. As one example, a filter may be designated as a "default" filter that is to be included in any new work item assignment workflow such that work items identified for potential assignment to an agent based on that work item assignment workflow include a certain, specified factor, even if that specified factor was not an indicated work item characteristic of the work item assignment workflow. As another example, a filter may dictate that obtained work items are to be refined based on an amount of work items. For instance, the admin may provide a user input indicating a maximum number of work items that should be identified for assignment. A filter may take other forms as well.

In some implementations, the one or more user interface views presented to the admin via the end-user device 203 may enable the admin to provide input defining a prioritization scheme according to which work items that have been obtained by the work item assignment subsystem 206 based on other aspects of the work item assignment workflow (e.g., a set of work item characteristics) and identified for potential assignment to the agent should be prioritized. In general, a prioritization scheme may indicate a weighting scale that instructs the back-end computing platform 201 on how to evaluate various factors in order to determine an order in which the identified work items should be assigned to an agent. In this regard, the prioritization scheme may define a particular order in which the identified work items are to be automatically assigned to an agent or presented to an agent for manual assignment. The prioritization scheme may define one or more factors-herein referred to as "prioritization factors"—that may be used to prioritize work items identified for assignment to an agent. Such prioritization factors may take various forms.

In one implementation, the one or more prioritization factors may correspond to one or more work item characteristic that are included in the work item assignment workflow.

For instance, a first possible prioritization factor that could be used by the prioritization scheme may be a create date, where work items having earlier-in-time create dates may be deemed to have a greater level of importance than work items having later-in-time create dates. Based on a create-date prioritization factor, at the time the prioritization scheme is applied, work items may be arranged in order of priority according to each work item's create date (e.g., earliest create date to latest create date) such that the work items are assigned or made available for assignment in that prioritized order.

A second possible prioritization factor that could be used by the prioritization scheme may be a priority level of a work item (e.g., a general urgency level), where work items having a higher priority level (e.g., high to medium priority) may be deemed to have a greater level of importance than work items having a lower priority level (e.g., medium to lower priority). Based on a priority level prioritization factor, at the time the prioritization scheme is applied, work items may be arranged in order of priority according to each work item's priority level (e.g., highest priority level to lowest priority level) such that the work items are assigned or made available for assignment in that prioritized order.

A third possible prioritization factor that could be used by the prioritization scheme may be a time sensitivity (e.g., a particular deadline by which a work item needs to be resolved), where work items having a higher time sensitivity (e.g., a more immediate deadline) may be deemed to have a greater level of importance than work items having a lower time sensitivity (e.g., a less urgent deadline). Based on a time sensitivity prioritization factor, at the time the prioritization scheme is applied, work items may be arranged in order of priority according to each work item's time sensitivity (e.g., highest time sensitivity to lowest time sensitivity) such that the work items are assigned or made available for assignment in that prioritized order.

A fourth possible prioritization factor that could be used by the prioritization scheme may be an originating BPM system of a work item, where work items originating from certain one or more BPM systems (e.g., a BPM system that tracks technical support work items, a BPM system that tracks customer support work items, etc.) may be deemed to have a greater level of importance than work items that originate from other BPM systems (e.g., a BPM system that tracks product delivery work items). Based on a BPM system prioritization factor, at the time the prioritization scheme is applied, work items may be arranged in order of priority according to each work item's originating BPM system such that the work items are assigned or made available for assignment in that prioritized order.

A fifth possible prioritization factor that could be used by the prioritization scheme may be a type of action required to resolve a work item, where work items requiring certain types of actions (e.g., contacting a customer to follow up on a customer question, contacting a customer to address an outstanding customer issue, etc.) may be deemed to have a greater level of importance than work items requiring other types of actions. Based on an action-type prioritization factor, at the time the prioritization scheme is applied, work items may be arranged in order of priority according to the action required to resolve each work item such that the work items are assigned or made available for assignment in that prioritized order.

A sixth possible prioritization factor that could be used by the prioritization scheme may be an agent skill level required to resolve a work item, where work items requiring higher agent skill levels may be deemed to have a greater level of importance than work items requiring lower agent skill levels. Based on an agent skill level prioritization factor, at the time the prioritization scheme is applied, work items may be arranged in order of priority according to the agent skill level (e.g., most sophisticated agent skill level to least sophisticated agent skill level) required to resolve each work item such that the work items are assigned or made available for assignment in that prioritized order.

A seventh possible prioritization factor that could be used by the prioritization scheme may be an expected amount of time it will take to resolve a work item, where work items that are expected to take a longer amount of time may be deemed to have a greater level of importance than work items that are expected to take a shorter amount of time, or vice versa. Based on a resolution time prioritization factor, at the time the prioritization scheme is applied, work items may be arranged in order of priority according to each work item's expected resolution time (e.g., highest resolution time to lowest resolution time, or vice versa) such the work items are assigned or made available for assignment in that prioritized order.

An eighth possible prioritization factor that could be used by the prioritization scheme may be an amount of time remaining in a requesting agent's scheduled workday, where work items that are more likely to be resolved before the end of the workday may be deemed to have a greater level of importance than work items that are less likely to be resolved before the end of the workday. In this respect, one or more other factors may be taken into account in order to determine a likelihood of whether a work item is more or less likely to be resolved before the end of the workday. For instance, an expected resolution time of each work item may be determined and compared against the time remaining in the requesting agent's scheduled workday in order to determine if the work item is likely to be resolved before the end of the workday if assigned to the agent.

A prioritization scheme may indicate other f prioritization actors based on which work items should be prioritized as well.

In some implementations, multiple prioritization factors may be indicated by a prioritization scheme such that work items are prioritized according to a combination of prioritization actors. For example, a prioritization scheme may include a create date factor and a priority level factor, where the priority level factor is to be considered as having more weight than the create date factor such that work items having a later-in-time create date and a higher priority level are deemed to be of more importance than work items having an earlier-in-time create date and a lower priority level. Many other combinations of factors and respective prioritizations are possible. In such implementations, the back-end computing platform 201 may determine a respective priority value for each work item based on determining and evaluating a factor-specific priority value for each factor that is indicated in the prioritization scheme, which will be discussed in more detail further below.

The function of applying a prioritization scheme to identified work items and thereby producing a prioritized listing of the identified work items based one or more prioritization factors will be described in more detail further below.

In line with the discussion above, the prioritization scheme (including the one or more prioritization factors) may be defined by the admin by providing user input via the one or more user interface views presented at the end-user device 203. The end-user device 203 may provide an indication of the data defining the prioritization scheme to the back-end computing platform 201. Returning to FIG. 3, at step 304, the back-end computing platform may receive the data defining the prioritization scheme.

In some implementations, the operations depicted at steps 303 and 304 may be combined such that the end-user device 203 transmits data defining the work item assignment workflow, including data defining the one or more work item characteristics and data defining the prioritization scheme, to the back-end computing platform 201.

In turn, at step 305, the back-end computing platform 201 may store the data defining the work item assignment workflow, including data indicating one or more work item characteristics that are to be used to identify work items for assignment to an agent and data defining a prioritization scheme that is to be applied for determining an order in which the identified work items are to be assigned to the agent. In one implementation, in line with the discussion above, the back-end computing platform 201 may store the data defining the work item assignment workflow in a location that is accessible by the work item assignment subsystem 206, such as the work item assignment workflow data store 204.

c. Example Techniques for Intelligently Assigning Work Items to Agent

As mentioned above, the various computing systems of the computing environment 200 shown in FIG. 2 may coordinate with one another to facilitate techniques disclosed herein related to intelligently assigning work items from a plurality of BPM systems to one or more agents.

Figure 4:
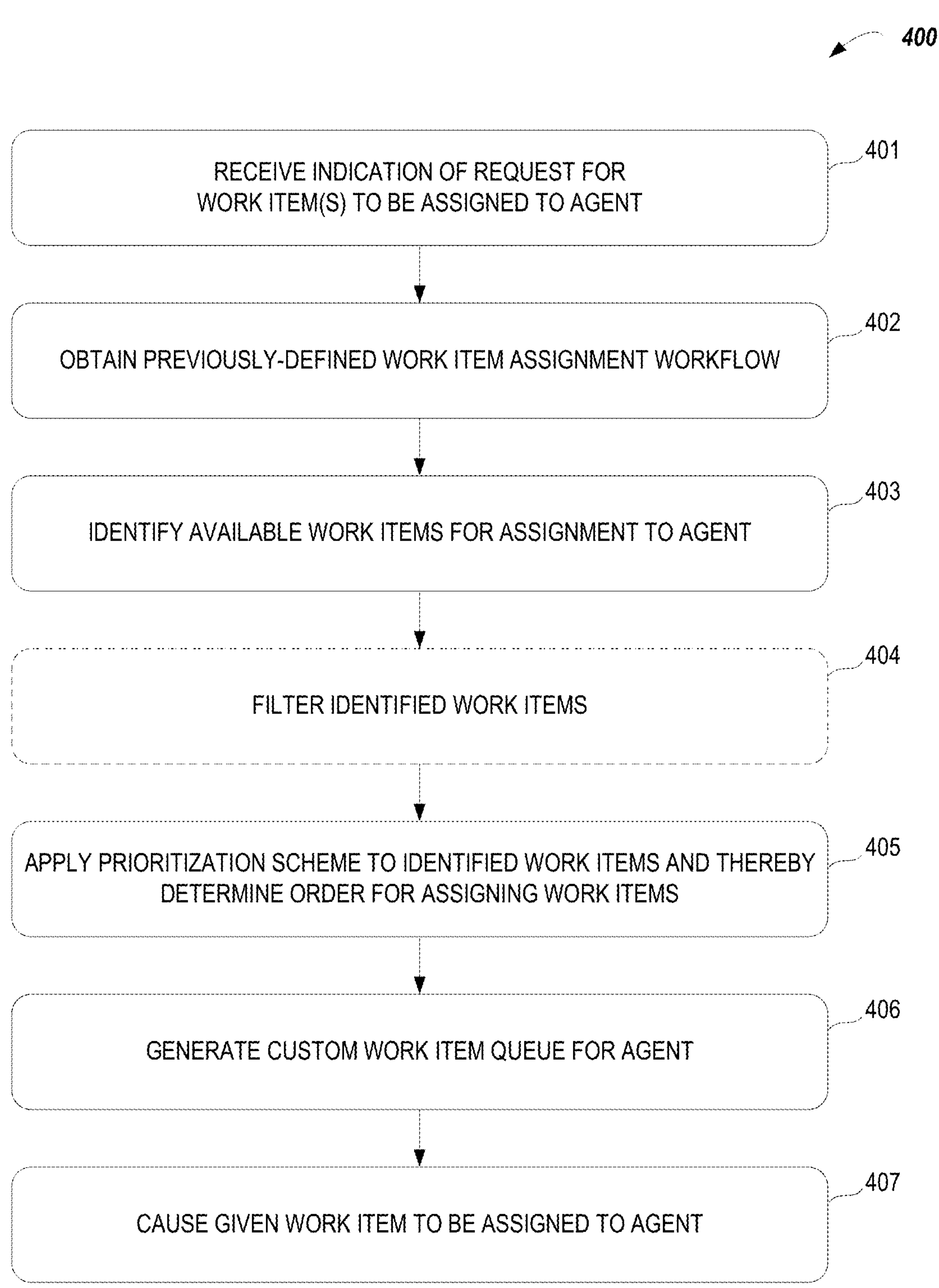
FIG. 4 depicts a flow chart of an example process for intelligently assigning work items in accordance with one example implementation of the disclosed technology.

Turning now to FIG. 4, a flow diagram of an example process 400 for intelligently assigning work items is shown. The example process 400 may include one or more operations, functions, or actions as illustrated by one or more of steps 401-407. Although steps 401-407 are illustrated in sequential order, these steps may also be performed in parallel, and/or in a different order than those described herein. Also, the various steps may be combined into fewer steps, divided into additional steps, and/or removed based upon the desired implementation. Furthermore, while the steps 401-407 may be described in the examples below as being performed by a certain computing subsystem depicted in the example shown in FIG. 2, such as the work item assignment subsystem 206, it is possible that depending on the implementation, any one or more of the steps 401-407 may be performed by a different computing subsystem depicted in the example shown in FIG. 2, or may be split amongst one or more of the computing subsystems depicted in the example shown in FIG. 2.

In addition, for the example process 400, the flow diagram shows functionality and operation of one possible implementation of embodiments described herein. In this regard, each step may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the example process 400, each step shown in FIG. 4 may represent circuitry that is wired to perform the specific logical functions in the process.

The example process 400 includes operations that may be carried out in relation to intelligently assigning work items to an agent, which may involve obtaining a previously-defined work item assignment workflow, identifying work items for assignment based on a first aspect of the obtained work item assignment workflow, prioritizing the identified work items based on a second aspect of the obtained work item assignment workflow, generating a work item queue, and causing a given work item to be assigned to the agent, among other possibilities. In the discussion below, certain steps of the example process 400 are described as being performed by the work item assignment subsystem 206, but it should be understood that depending on the implementation, the functionalities described herein with respect to the example process 400 may be performed by one or more other subsystems of the back-end computing platform 201.

The example process 400 may be initiated by an employee of a business organization who is responsible for completing human-side operations of business tasks (who may also be referred to herein as an agent) submitting a request for a work item(s) to be assigned to the agent. In practice, the agent may access, via an end-user device 105, a software application 202*b* (e.g., a web application, a mobile application, etc.)—which may also be referred to herein as a portal-hosted by the back-end computing platform 201 that is operated by the business organization. In this regard, in one implementation, the portal 202*b* may be an agent-specific portal that provides access to features and/or user interface views for performing tasks associated with agent responsibilities, such as requesting, accessing, and resolving work items. In another implementation, the portal 202*b* may be a general portal accessible to any employee of the business organization that provides access to certain features and/or user interface views of the portal based on an employee's individual permissions and responsibilities. In any event, the agent may have an existing user account with the business organization and may log in to the portal by providing login credentials corresponding to the agent's user account.

In turn, the login credentials may be validated by the back-end computing platform 201 to authenticate the agent. In one implementation, the authentication may be performed by the authentication subsystem 208. For instance, the back-end computing platform 201 may receive data from the end-user device 105 that includes the agent's login credentials, and the authentication subsystem 208 may perform the authentication based on the provided login credentials to determine if the agent has permission to access the one or more user interface views for performing tasks associated with agent responsibilities. If the authentication is successful, the back-end computing platform 201 may cause the end-user device 105 to provide the agent with access, and the agent may then navigate to the one or more user interface views for requesting work items and input a request for a work item assignment. In this regard, the request may take various forms. For example, as one possibility, the request may comprise a request to be assigned a work item. As another possibility, the request may comprise a request to be provided with a personalized work item queue including one or more work items for assignment to the agent. In any event, based on the input, the end-user device 203 may provide an indication of the request to the back-end computing platform 201.

At step 401, the work item assignment subsystem 206 may receive the indication of the request for a work item assignment.

At step 402, based on the request for the work item assignment, the work item assignment subsystem 206 may obtain a previously-defined work item assignment workflow from a data store of the back-end computing platform 201, such as the work item assignment workflow data store 204. In line with the discussion above with reference to FIGS. 2 and 3, the previously-defined work item assignment workflow may have been stored by the back-end computing platform 201 at the work item assignment workflow data store 204 after receiving data defining the workflow from an end-user device 203 associated with an admin. The function of obtaining a work item assignment workflow may take various forms.

For example, as one possibility, the work item assignment subsystem 206 may obtain a most-recently defined work item assignment workflow. As another possibility, the work item assignment subsystem 206 may obtain a work item assignment workflow that has been designated as a default workflow. As yet another possibility, the work item assignment subsystem 206 may obtain a work item assignment workflow based on information about a given agent on whose behalf the work item assignment request was received. For instance, the work item assignment subsystem 206 may have access to information about an agent group associated with the given agent or an employee role associated with the given agent, and the work item assignment subsystem 206 may obtain a given work item assignment workflow that has been designated for agents associated with the agent group or the employee role. Other examples are also possible.

Based on the obtained work item assignment workflow, the work item assignment subsystem 206 may identify one or more work items that may be assigned to the agent. For instance, at step 403, based on the obtained work item assignment workflow, the work item assignment subsystem 206 may identify available work items that may be assigned to the agent. In line with the discussion above, the work items that are identified by the work item assignment subsystem 206 may generally be dictated by the work item assignment workflow that was obtained by the work item assignment subsystem 206. The function of identifying work items for assignment may take various forms.

In one implementation, identifying the work items may comprise obtaining a respective set of available (e.g., unassigned) work items from one or more BPM systems. In this regard, the work item assignment subsystem 206 may interact with the token subsystem 210 in order to obtain the respective sets of work items.

For instance, the token subsystem 210 may function to generate one or more access tokens that provide the work item assignment subsystem 206 with access to a respective application programming interface (API) of each BPM system. In one implementation, the token subsystem 210 may generate a single access token that may be used by the work item assignment subsystem 206 to communicate with multiple BPM system APIs. In other implementations, the token subsystem 210 may generate multiple access tokens that may each be used by the work item assignment subsystem 206 to communicate with a given BPM system API. In any event, advantageously, the token subsystem 210 alleviates the burden that would otherwise fall on the agent to individually access each BPM system's dedicated interface portal to request work items from the BPM system.

In some implementations, before generating the access token(s), the token subsystem 210 may communicate with the authentication subsystem 208 to confirm that a successful authentication for the agent was performed.

Based on receiving the access token(s) from the token subsystem 210, the work item assignment subsystem 206 may proceed to request work items from one or more BPM systems. The function of requesting work item(s) from the one or more BPM systems may take various forms.

In one implementation, requesting work items may comprise the work item assignment subsystem 206 sending a request to each of one or more BPM systems to provide a respective set of all available (e.g., unassigned) work items from that BPM system that meet certain criteria. As one example, the criteria may correspond to any work item characteristics that are indicated in the work item assignment workflow that was obtained by the work item assignment subsystem 206 at step 402. For instance, the work item assignment subsystem 206 may send a request to each of the BPM systems 101-104 to return any work items that have characteristics matching one or more work item characteristics indicated in the obtained work item assignment workflow. For example, the workflow obtained by the work item assignment subsystem 206 may indicate two particular work item characteristics: a particular create date and a particular priority level. Therefore, the work item assignment subsystem 206 may request each of the BPM systems 101-104 to provide any unassigned work items that have characteristics which match the particular create date and the particular priority level indicated in the workflow. As another example, the criteria may additionally or alternatively correspond to one or more characteristics of the requesting agent, such as the agent's qualifications, skill level, agent group, among other possibilities. For instance, the requesting agent may have a certain skill level and may be proficient in two certain languages. Therefore, the work item assignment subsystem 206 may request each of the BPM systems 101-104 to provide any unassigned work items which require an agent with the certain skill level or an agent that is proficient in the two certain languages. Other examples are also possible.

In another implementation, requesting work items may comprise the work item assignment subsystem 206 sending a request to each of one or more BPM systems to provide a respective set of all available (e.g., unassigned) work items from that BPM system, without further qualification. In such an implementation, after receiving the respective sets of work items, the work item assignment subsystem 206 may combine all of the work items from each respective set into a collective listing of available work items that may be assigned to the agent and then, at step 404, filter the listing of work items based on certain criteria. In line with the discussion above, the criteria based on which the work item assignment subsystem 206 may filter the listing of work items may correspond to one or more work item characteristics included in the obtained work item assignment workflow, one or more characteristics related to the requesting agent, some other criteria (e.g., any filters defined by the work item assignment workflow, etc.), or a combination thereof, among other possibilities.

In some implementations, identifying the work items may comprise a combination of requesting work items from one or more BPM systems (either based on certain criteria or without further qualification) and additionally filtering the obtained work items based on or more factors.

After identifying available work items that may be assigned to the agent, the work item assignment subsystem 206 may take one or more further actions to prepare the identified work items for assignment to the agent. Preparing the identified work items for assignment to the agent may take various forms.

For example, as one possibility, if the work item assignment workflow obtained at step 402 indicates a prioritization scheme, the work item assignment subsystem 206 may apply the prioritization scheme to the identified work items to determine an order in which the pool of work items should be assigned to the agent. For instance, at step 405, the work item assignment subsystem 206 may apply a prioritization scheme to the identified work items. In line with the discussion above, a given prioritization scheme may be defined to take into account any one or more of the possible prioritization factors described above with reference to FIG. 3 when prioritizing work items. The particular manner in which the one or more prioritization factors are used by the back-end computing platform 201 (e.g., the work item assignment subsystem 206) when applying the prioritization scheme may take various forms.

In one implementation, for instance, the prioritization scheme applied by the work item assignment subsystem 206 may comprise a scheme that uses only one prioritization factor to prioritize work items for potential assignment to an agent. For example, if a prioritization scheme is defined to use only an agent skill level prioritization factor for prioritizing work items, then that scheme may be configured to order the work items for assignment based solely on the importance of a required agent skill level of each work item.

In another implementation, the prioritization scheme applied by the work item assignment subsystem 206 may comprise a scheme that uses two or more prioritization factors to prioritize the work items. In such an implementation, the work item assignment subsystem 206 may be configured to (i) use the two or more prioritization factors to determine a respective priority value for each work item and then (ii) use the respective priority values that are determined for the work items to sort the work items for potential assignment in a particular order (e.g., highest priority value to lowest priority value).

The work item assignment subsystem 206 may determine a respective priority value for each work item in various ways.

As one possibility, the work item assignment subsystem 206 may determine a respective priority value for a given work item by first assigning the given work item a factor-specific value for each prioritization factor, which could take any of various different forms depending on the factor.

For instance, for some factors, the factor-specific value may be a binary value such as 0 or 1. One representative example of such a factor may include whether there is a deadline governing completion of the work item. However, it should be understood that this factor could alternatively or additionally be expressed in terms of a categorical and/or numerical value as well (e.g., a categorical or numerical value that quantifies the urgency of a deadline to the extent one exists), and that at least some of the other factors discussed herein could also be expressed in terms of binary values instead of (or in addition to) being expressed in terms of categorical and/or numerical values.

For other factors, the factor-specific value may be a categorical value that is selected from a predefined set of possible numerical values that can quantify the factor, such as a predefined scale of numerical values (e.g., a scale ranging from 1 to 10). Representative examples of such factors may include time sensitivity, priority level, or agent skill level, among other possibilities. However, it should be understood that these factors could alternatively or additionally be expressed in terms of binary and/or numerical values as well, and that at least some of the other factors discussed herein could also be expressed in terms of categorical values instead of (or in addition to) being expressed in terms of binary and/or numerical values.

For still other factors, the factor-specific value may be a value that provides some other meaningful way to quantify the factor. One representative example of such a factor may include an expected resolution time to resolve a work item, which may be expressed in terms of some numerical measure of how much time it is expected to take to resolve the work item. However, it should be understood that this factor could alternatively or additionally be expressed in terms of a binary and/or categorical value as well, and that at least some of the other factors discussed herein could also be expressed in terms of numerical values instead of (or in addition to) being expressed in terms of binary and/or categorical values.

The factor-specific value that is assigned to a given work item for each factor of interest may take other forms as well.

After the work item assignment subsystem 206 determines the factor-specific values for a given work item, the back-end computing platform 201 may then use the determined factor-specific values to determine a priority value for the given work item in any of various manners, examples of which may involve combining the factor-specific values together using mathematical operations (e.g., averaging the priority values) or perhaps also weighting certain of the factor-specific values, among other possibilities.

The work item assignment subsystem 206 may determine the respective priority values for the identified work items in various other ways as well.

After determining the respective priority values for the identified work items, the work item assignment subsystem 206 may use the determined respective priority values to sort the identified work items in order of their respective priority values for assignment to the agent.

As another example of preparing the identified work items for assignment to the agent, the work item assignment subsystem 206 may generate a work item queue based on the identified work items. For instance, at step 406, the work item assignment subsystem 206 may generate a personalized work item queue for the requesting agent (e.g., the agent on whose behalf the work item assignment subsystem 206 received the work item assignment request).

In one implementation, the generated personalized work item queue may be made available to the agent. For example, the work item assignment subsystem 206 may cause a representation of the personalized work item queue to be displayed by the end-user device 105 for viewing by the agent. The agent may then be able to select a given work item that is to be assigned to the agent. In some instances, the agent may be presented with the representation of the personalized work item queue but may only be able to select the first-listed work item so that the work items are assigned in the prioritized order determined by the work item assignment subsystem 206 at step 405. In other instances, the agent may be presented with the representation of the personalized work item queue but may not be able to manually select a work item; instead, the first-listed work item may automatically be assigned to the agent by the work item assignment subsystem 206.

Notably, the work item queue may be personalized in that it may be accessible via the requesting agent's user account. Further, the work item queue may be personalized in that it may include only those work items that have agent-related characteristics (e.g., qualifications, skill level, etc.) matching respective agent-related characteristics of the requesting agent. Advantageously, including only those work items that have agent-related characteristics matching respective agent-related characteristics of the requesting agent reduces situations where the agent might be assigned a work item that requires a higher skill level than the agent possesses, which may result in the agent being unable to resolve the work item or attempting to resolve the work item despite not having the appropriate skill level and perhaps delaying resolution of the work item and/or causing customer dissatisfaction as a result.

In another implementation, the generated personalized work item queue may be temporarily stored by the work item assignment subsystem 206 (or another computing subsystem of the back-end computing platform 201), and work items may be automatically selected by the work item assignment subsystem 206 for assignment to the agent in order of priority. For instance, the work item assignment subsystem 206 may begin by determining that a first work item in the personalized work item queue is to be assigned to the given agent and causing the first work item to be assigned to the agent. After receiving an indication that the first work item has been successfully resolved, the work item assignment subsystem 206 may determine that a second work item in the personalized work item queue is to be assigned to the agent and may thus cause the second work item to be assigned to the agent, and so forth. In this respect, in some implementations, after a given work item has been assigned to the agent, the given work item may be removed from the personalized work item queue, in which case the work item assignment subsystem 206 may proceed to assign the first-listed work item each time a new work item is to be assigned to the agent.

Regardless of the implementation, after a given work item has been selected for assignment to the agent (e.g., manually selected by the agent or automatically selected by the work item assignment subsystem 206), at step 407, the work item assignment subsystem 206 may cause the given work item to be assigned to the agent. Causing a given work item to be assigned to an agent may take various forms.

For example, as one possibility, causing a given work item to be assigned to an agent may involve notifying the originating BPM system of the given work item that the given work item has been assigned to an agent and is no longer available for assignment to any other agent. In turn, the originating BPM system may update its work item list to indicate that the given work item has been assigned and should not be provided to the work item assignment subsystem 206 in response to a future request for available work items from that BPM system (e.g., requests corresponding to other agents).

As another possibility, causing a given work item to be assigned to an agent may involve causing the end-user device 105 to display one or more user interface views, user interface tools, user interface features, and/or instructions that may be used to resolve the given work item.

Causing a given work item to be assigned to an agent may take other forms as well.

Advantageously, the software technology and techniques disclosed herein enable a business organization to easily define custom work item assignment workflows based on the needs, goals, and strategies of the business organization. Furthermore, the software technology and techniques disclosed herein enable a business organization to easily update an existing work item assignment workflow based on evolving needs, goals, or strategies of the business organization. For instance, after an admin has created a work item assignment workflow in line with the discussion above with reference to FIG. 3, the admin (or a different admin of the business organization) may provide user input modifying the work item assignment workflow via the portal 202*a*. The data defining the work item assignment workflow that is stored at the work item assignment workflow data store 204 may be updated accordingly to reflect the modifications indicated by the admin. In turn, the work item assignment subsystem 206 may perform one or more of the steps discussed above with reference to FIG. 4 to update a personalized work item queue that was generated for an agent based on the previous version of the work item assignment workflow. In this way, personalized work item queues that have been generated may be updated in real-time according to revisions made to a corresponding work item assignment workflow in order to provide agents with a most accurate listing of work items.

Moreover, the software technology and techniques disclosed herein provide a mechanism for an agent of a business organization to request a work item queue that has been generated specifically for the agent, which may eliminate (or significantly reduce) the need for the agent to spend time determining what work item(s) to work on and whether a given work item is suitable for the agent, and which may also increase agent productivity as an agent can focus their time, attention, and energy on obtaining a personalized work item queue and then proceeding to address those work items.

d. Example Computing Platform

Figure 5:
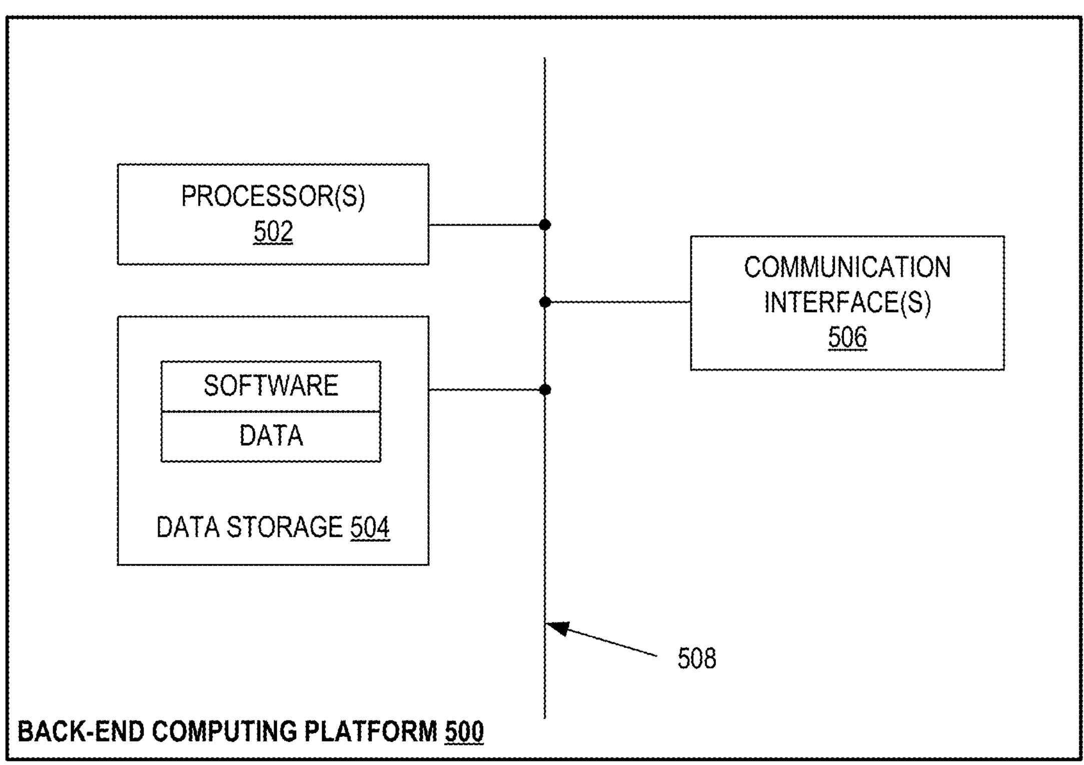
FIG. 5 depicts an example block diagram of structural components of an example computing platform that is configured to carry out one or more operations in accordance with the disclosed technology.

Turning now to FIG. 5, a simplified block diagram is provided to illustrate some structural components that may be included in an example back-end computing platform 500 that may be configured to carry out any of the various functions disclosed herein, including but not limited to any of the functions described above with reference to FIG. 3 or FIG. 4. At a high level, the example back-end computing platform 500 may generally comprise any one or more computing systems that collectively include one or more processors 502, data storage 504, and one or more communication interfaces 506, all of which may be communicatively linked by a communication link 508 that may take the form of a system bus, a communication network such as a public, private, or hybrid cloud, or some other connection mechanism. Each of these components may take various forms.

The one or more processors 502 may each comprise one or more processing components, such as general-purpose processors (e.g., a single- or a multi-core central processing unit (CPU)), special-purpose processors (e.g., a graphics processing unit (GPU), application-specific integrated circuit, or digital-signal processor), programmable logic devices (e.g., a field programmable gate array), controllers (e.g., microcontrollers), and/or any other processor components now known or later developed. In line with the discussion above, it should also be understood that the one or more processors 502 could comprise processing components that are distributed across a plurality of physical computing systems connected via a network.

In turn, the data storage 504 may comprise one or more non-transitory computer-readable storage mediums that are collectively configured to store (i) program instructions that are executable by one or more processors 502 such that back-end computing platform 500 is configured to perform any of the various functions disclosed herein, and (ii) data that may be received, derived, or otherwise stored, for example, in one or more databases, file systems, repositories, or the like, by back-end computing platform 500, in connection with performing any of the various functions disclosed herein. In this respect, the one or more non-transitory computer-readable storage mediums of the data storage 504 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 504 may comprise computer-readable storage mediums that are distributed across a plurality of physical computing systems connected via a network.

Figure 6:
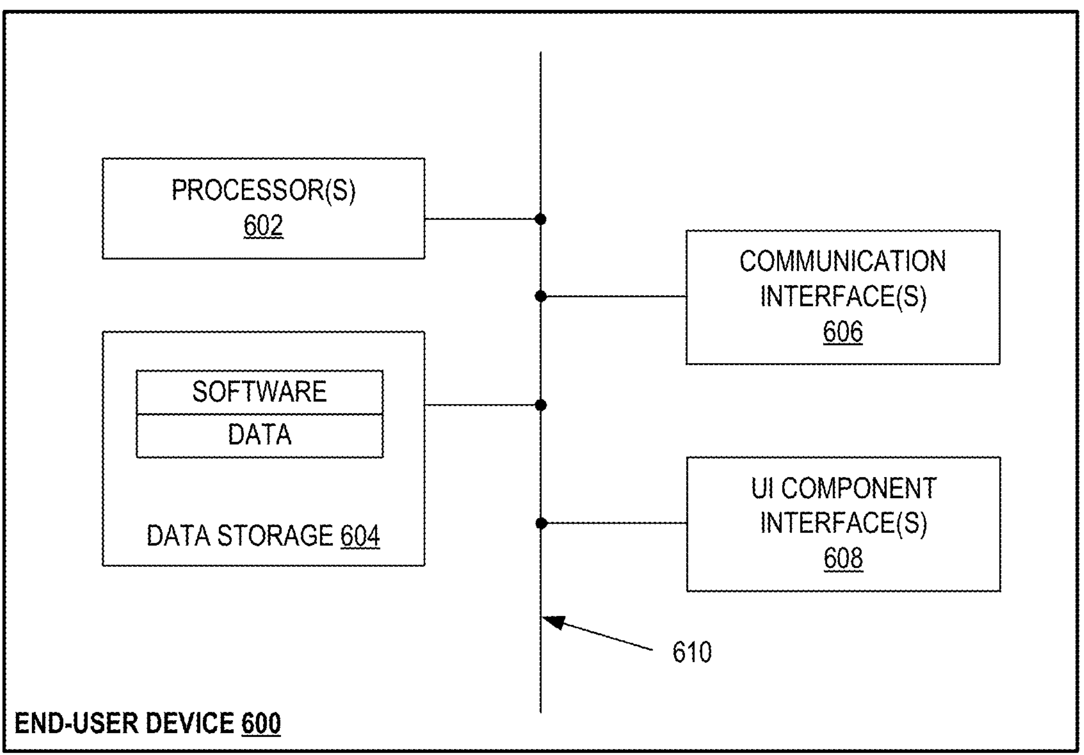
FIG. 6 depicts an example block diagram of structural components of an example end-user device that is configured to communicate with the computing platform of FIG. 5 in accordance with the disclosed technology.

The one or more communication interfaces 506 may be configured to facilitate wireless and/or wired communication with other systems and/or devices, such as end-user devices (e.g., one or more end-user devices 600 of FIG. 6). Additionally, in an implementation where the back-end computing platform 500 comprises a plurality of physical computing systems connected via a network, the one or more communication interfaces 506 may be configured to facilitate wireless and/or wired communication between these physical computing systems (e.g., between computing and storage clusters in a cloud network). As such, the one or more communication interfaces 506 may each take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

Although not shown, the back-end computing platform 500 may additionally include or have an interface for connecting to one or more user-interface components that facilitate user interaction with the back-end computing platform 500, such as a keyboard, a mouse, a trackpad, a display screen, a touch-sensitive interface, a stylus, a virtual-reality headset, and/or one or more speaker components, among other possibilities.

It should be understood that the back-end computing platform 500 is one example of a computing platform that may be used with the embodiments described herein. Numerous other arrangements are possible and contemplated herein. For instance, in other embodiments, the back-end computing platform 500 may include additional components not pictured and/or more or fewer of the pictured components.

e. Example End-User Device

Turning next to FIG. 6, a simplified block diagram is provided to illustrate some structural components that may be included in an example end-user device 600 that is configured to communicate with the back-end computing platform 500, such as an end-user device used by an administration of a business organization or an agent of the business organization during any of the processes 300 or 400 described above with reference to FIGS. 3 and 4. As shown in FIG. 6, the end-user device 600 may include one or more processors 602, data storage 604, one or more communication interfaces 606, and one or more user-interface components 608, all of which may be communicatively linked by a communication link 610 that may take the form of a system bus or some other connection mechanism. Each of these components may take various forms.

The one or more processors 602 may comprise one or more processing components, such as general-purpose processors (e.g., a single- or a multi-core CPU), special-purpose processors (e.g., a GPU, application-specific integrated circuit, or digital-signal processor), programmable logic devices (e.g., a field programmable gate array), controllers (e.g., microcontrollers), and/or any other processor components now known or later developed.

In turn, the data storage 604 may comprise one or more non-transitory computer-readable storage mediums that are collectively configured to store (i) program instructions that are executable by the processor(s) 602 such that the end-user device 600 is configured to perform certain functions related to interacting with and accessing services provided by a computing platform, and (ii) data that may be received, derived, or otherwise stored, for example, in one or more databases, file systems, repositories, or the like, by the end-user device 600, related to interacting with and accessing services provided by a computing platform. In this respect, the one or more non-transitory computer-readable storage mediums of the data storage 604 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. The data storage 604 may take other forms and/or store data in other manners as well.

The one or more communication interfaces 606 may be configured to facilitate wireless and/or wired communication with other computing devices. The communication interface(s) 606 may take any of various forms, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

The end-user device 600 may additionally include or have interfaces for one or more user-interface components 608 that facilitate user interaction with the end-user device 600, such as a keyboard, a mouse, a trackpad, a display screen, a touch-sensitive interface, a stylus, a virtual-reality headset, and/or one or more speaker components, among other possibilities.

It should be understood that the end-user device 600 is one example of an end-user device that may be used to interact with an example computing platform as described herein. Numerous other arrangements are possible and contemplated herein. For instance, in other embodiments, the end-user device 600 may include additional components not pictured and/or more or fewer of the pictured components.

CONCLUSION

This disclosure makes reference to the accompanying figures and several example embodiments of the disclosed innovations that have been described above. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

The invention claimed is:

1. A computing platform comprising:

at least one network interface;

at least one processor;

at least one non-transitory computer-readable medium; and program instructions stored on the at least one non-transitory computer-readable medium that are executable by the at least one processor such that the computing platform is configured to:

receive, from an end-user device associated with a given agent, a request to access a portal for requesting assignment of work items from a plurality of disparate business process management (BPM) systems, wherein the request comprises portal login credentials for the given agent, and wherein each respective BPM system of the plurality of disparate BPM systems comprises a respective software platform for tracking work items that has (i) a respective system-specific application programming interface (API) for accessing the respective BPM system and (ii) a respective system-specific user interface for facilitating user interaction with the respective BPM system;

validate the portal login credentials for the given agent and thereby authenticate the given agent;

in response to authenticating the given agent, cause the end-user device to display a unified user interface of the portal that enables agents to request assignment of work items from the plurality of disparate BPM systems without individually accessing the respective system-specific user interfaces of the plurality of disparate BPM systems;

receive, from the end-user device associated with the given agent, an indication of a work item assignment request that was submitted by the given agent via the unified user interface of the portal that enables agents to request assignment of work items from the plurality of disparate BPM systems;

based on the work item assignment request:

obtain a work item assignment workflow that includes a prioritization scheme for sorting identified work items;

obtain one or more access tokens for accessing the plurality of BPM systems on behalf of the given agent without requiring the given agent to individually access each of the plurality of disparate BPM systems;

utilize the one or more access tokens to identify a set of work items that are available for assignment to the given agent, wherein identifying the set of work items comprises, for each respective BPM system of the plurality of disparate BPM systems:

(i) transmitting, to the respective BPM system via the respective system-specific API of the respective BPM system, a respective request for an identification of work items from the respective BPM system that are available for assignment to the given agent, wherein the respective request comprises a respective one of the obtained one or more access tokens; and (ii) receiving, from the respective BPM system via the respective system-specific API of the respective BPM system, an identification of a respective subset of work items from the respective BPM system that are available for assignment to the given agent, wherein the identified set of work items comprises respective subsets of work items from the respective BPM systems;

apply the prioritization scheme to the identified set of work items and thereby determine an order for assigning the work items in the set of work items to the given agent;

based on determining the order for assigning the work items, generate a personalized work item queue for the given agent; and cause a given work item from the personalized work item queue to be assigned to the given agent, wherein the given work item originates from a given BPM system from the plurality of disparate BPM systems, and wherein causing the given work item to be assigned to the given agent comprises:

(i) transmitting, to the given BPM system via the respective system-specific API of the given BPM system, a notification that the given work item has been assigned and thereby causing the given BPM system to designate the given work item as having been assigned; and (ii) causing the end-user device associated with the given agent to display a representation of the given work item via the unified user interface of the portal for requesting assignment of work items from the plurality of disparate BPM systems.

2. The computing platform of claim 1, wherein the work item assignment workflow further indicates one or more factors based on which work items are to be identified.

3. The computing platform of claim 2, wherein the one or more factors include one or more of a create date, an agent skill level, a time sensitivity, or a priority level.

4. The computing platform of claim 2, wherein the respective request transmitted to each respective BPM system includes an indication of the one or more factors based on which work items are to be identified.

5. The computing platform of claim 1, wherein the prioritization scheme indicates one or more factors according to which identified work items should be prioritized for assignment, and wherein the program instructions that are executable by the at least one processor such that the computing platform is configured to apply the prioritization scheme to the set of work items comprise program instructions that are executable by the at least one processor such that the computing platform is configured to:

for each work item in the set of work items:

determine a respective factor-specific priority value for each factor; and based on the respective factor-specific priority values, determine a work item-specific priority value; and sort the set of work items according to each work item's respective work item-specific priority value.

6. The computing platform of claim 1, further comprising program instructions stored on the at least one non-transitory computer-readable medium that are executable by the at least one processor such that the computing platform is configured to:

before receiving the indication of the work item assignment request:

cause an end-user device associated with a user to display one or more user interface views for defining work item assignment workflows;

receive data defining the work item assignment workflow; and cause storage of a data record representing the work item assignment workflow.

7. The computing platform of claim 1, further comprising program instructions stored on the at least one non-transitory computer-readable medium that are executable by the at least one processor such that the computing platform is configured to:

after generating the personalized work item queue for the given agent:

receive data defining a modification to the work item assignment workflow;

update a data record representing the work item assignment workflow to reflect the modification; and update the personalized work item queue for the given agent in real-time in accordance with the modification to the work item assignment workflow.

8. The computing platform of claim 1, wherein the personalized work item queue comprises a subset of the set of work items.

9. The computing platform of claim 1, wherein the program instructions that are executable by the at least one processor such that the computing platform is configured to obtain the one or more access tokens for accessing the plurality of BPM systems on behalf of the given agent comprise program instructions that are executable by the at least one processor such that the computing platform is configured to:

obtain the one or more access tokens for accessing the plurality of BPM systems on behalf of the given agent in response to confirming that a successful authentication of the given agent was performed.

10. The computing platform of claim 1, wherein the one or more access tokens comprise a single access token for use in communicating with the plurality of BPM systems.

11. At least one non-transitory computer-readable medium, wherein the at least one non-transitory computer-readable medium is provisioned with program instructions that, when executed by at least one processor, cause a computing platform to:

receive, from an end-user device associated with a given agent, a request to access a portal for requesting assignment of work items from a plurality of disparate business process management (BPM) systems, wherein the request comprises portal login credentials for the given agent, and wherein each respective BPM system of the plurality of disparate BPM systems comprises a respective software platform for tracking work items that has (i) a respective system-specific application programming interface (API) for accessing the respective BPM system and (ii) a respective system-specific user interface for facilitating user interaction with the respective BPM system;

validate the portal login credentials for the given agent and thereby authenticate the given agent;

in response to authenticating the given agent, cause the end-user device to display a unified user interface of the portal that enables agents to request assignment of work items from the plurality of disparate BPM systems without individually accessing the respective system-specific user interfaces of the plurality of disparate BPM systems;

receive, from the end-user device associated with the given agent, an indication of a work item assignment request that was submitted by the given agent via the unified user interface of the portal that enables agents to request assignment of work items from the plurality of disparate BPM systems;

based on the work item assignment request:

obtain a work item assignment workflow that includes a prioritization scheme for sorting identified work items;

obtain one or more access tokens for accessing the plurality of BPM systems on behalf of the given agent without requiring the given agent to individually access each of the plurality of disparate BPM systems;

utilize the one or more access tokens to identify a set of work items that are available for assignment to the given agent, wherein identifying the set of work items comprises, for each respective BPM system of the plurality of disparate BPM systems:

(i) transmitting, to the respective BPM system via the respective system-specific API of the respective BPM system, a respective request for an identification of work items from the respective BPM system that are available for assignment to the given agent, wherein the respective request comprises a respective one of the obtained one or more access tokens; and (ii) receiving, from the respective BPM system via the respective system-specific API of the respective BPM system, an identification of a respective subset of work items from the respective BPM system that are available for assignment to the given agent, wherein the identified set of work items comprises respective subsets of work items from the respective BPM systems;

apply the prioritization scheme to the identified set of work items and thereby determine an order for assigning the work items in the set of work items to the given agent;

based on determining the order for assigning the work items, generate a personalized work item queue for the given agent; and cause a given work item from the personalized work item queue to be assigned to the given agent, wherein the given work item originates from a given BPM system from the plurality of disparate BPM systems, and wherein causing the given work item to be assigned to the given agent comprises:

(i) transmitting, to the given BPM system via the respective system-specific API of the given BPM system, a notification that the given work item has been assigned and thereby causing the given BPM system to designate the given work item as having been assigned; and (ii) causing the end-user device associated with the given agent to display a representation of the given work item via the unified user interface of the portal for requesting assignment of work items from the plurality of disparate BPM systems.

12. The at least one non-transitory computer-readable medium of claim 11, wherein the work item assignment workflow further indicates one or more factors based on which work items are to be identified.

13. The at least one non-transitory computer-readable medium of claim 12, wherein the one or more factors include one or more of a create date, an agent skill level, a time sensitivity, or a priority level.

14. The at least one non-transitory computer-readable medium of claim 12, wherein the respective request transmitted to each respective BPM system includes an indication of the one or more factors based on which work items are to be identified.

15. The at least one non-transitory computer-readable medium of claim 11, wherein the prioritization scheme indicates one or more factors according to which identified work items should be prioritized for assignment, and wherein the program instructions that, when executed by the at least one processor, cause the computing platform to apply the prioritization scheme to the set of work items comprise program instructions that, when executed by the at least one processor, cause the computing platform to:

for each work item in the set of work items:

determine a respective factor-specific priority value for each factor; and based on the respective factor-specific priority values, determine a work item-specific priority value; and sort the set of work items according to each work item's respective work item-specific priority value.

16. The at least one non-transitory computer-readable medium of claim 11, wherein the at least one non-transitory computer-readable medium is also provisioned with program instructions that, when executed by the at least one processor, cause the computing platform to:

before receiving the indication of the work item assignment request:

cause an end-user device associated with a user to display one or more user interface views for defining work item assignment workflows;

receive data defining the work item assignment workflow; and cause storage of a data record representing the work item assignment workflow.

17. The at least one non-transitory computer-readable medium of claim 11, wherein the at least one non-transitory computer-readable medium is also provisioned with program instructions that, when executed by the at least one processor, cause the computing platform to:

after generating the personalized work item queue for the given agent:

receive data defining a modification to the work item assignment workflow;

update a data record representing the work item assignment workflow to reflect the modification; and update the personalized work item queue for the given agent in real-time in accordance with the modification to the work item assignment workflow.

18. The at least one non-transitory computer-readable medium of claim 11, wherein the personalized work item queue comprises a subset of the set of work items.

19. A method carried out by a computing platform, the method comprising:

receiving, from an end-user device associated with a given agent, a request to access a portal for requesting assignment of work items from a plurality of disparate business process management (BPM) systems, wherein the request comprises portal login credentials for the given agent, and wherein each respective BPM system of the plurality of disparate BPM systems comprises a respective software platform for tracking work items that has (i) a respective system-specific application programming interface (API) for accessing the respective BPM system and (ii) a respective system-specific user interface for facilitating user interaction with the respective BPM system;

validating the portal login credentials for the given agent and thereby authenticating the given agent;

in response to authenticating the given agent, causing the end-user device to display a unified user interface of the portal that enables agents to request assignment of work items from the plurality of disparate BPM systems without individually accessing the respective system-specific user interfaces of the plurality of disparate BPM systems;

receiving, from the end-user device associated with the given agent, an indication of a work item assignment request that was submitted by the given agent via the unified user interface of the portal that enables agents to request assignment of work items from the plurality of disparate BPM systems;

based on the work item assignment request:

obtaining a work item assignment workflow that includes a prioritization scheme for sorting identified work items;

obtaining one or more access tokens for accessing the plurality of BPM systems on behalf of the given agent without requiring the given agent to individually access each of the plurality of disparate BPM systems;

utilizing the one or more access tokens to identify a set of work items that are available for assignment to the given agent, wherein identifying the set of work items comprises, for each respective BPM system of the plurality of disparate BPM systems:

(i) transmitting, to the respective BPM system via the respective system-specific API of the respective BPM system, a respective request for an identification of work items from the respective BPM system that are available for assignment to the given agent, wherein the respective request comprises a respective one of the obtained one or more access tokens; and (ii) receiving, from the respective BPM system via the respective system-specific API of the respective BPM system, an identification of a respective subset of work items from the respective BPM system that are available for assignment to the given agent, wherein the identified set of work items comprises respective subsets of work items from the respective BPM systems;

applying the prioritization scheme to the identified set of work items and thereby determining an order for assigning the work items in the set of work items to the given agent;

based on determining the order for assigning the work items, generating a personalized work item queue for the given agent; and causing a given work item from the personalized work item queue to be assigned to the given agent, wherein the given work item originates from a given BPM system from the plurality of disparate BPM systems, and wherein causing the given work item to be assigned to the given agent comprises:

(i) transmitting, to the given BPM system via the respective system-specific API of the given BPM system, a notification that the given work item has been assigned and thereby causing the given BPM system to designate the given work item as having been assigned; and (ii) causing the end-user device associated with the given agent to display a representation of the given work item via the unified user interface of the portal for requesting assignment of work items from the plurality of disparate BPM systems.

20. The method of claim 19, wherein the work item assignment workflow further indicates one or more factors based on which work items are to be identified.

* * * * *